Dec. 30, 1952   J. C. KALBACH   2,623,816
METHOD FOR THE PRODUCTION OF HIGH HEATING VALUE FUEL GAS
Filed Dec. 16, 1947   2 SHEETS—SHEET 1
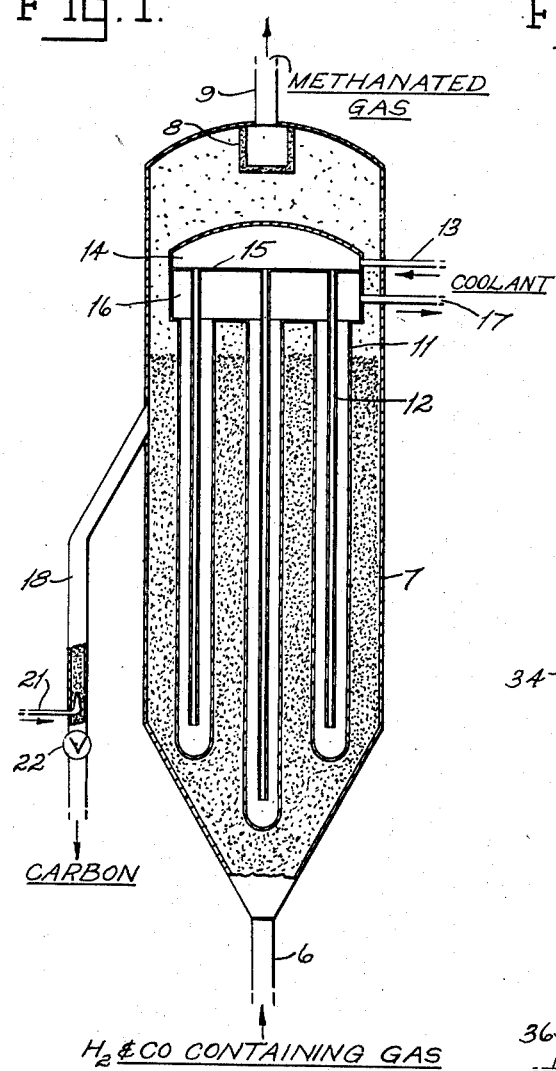
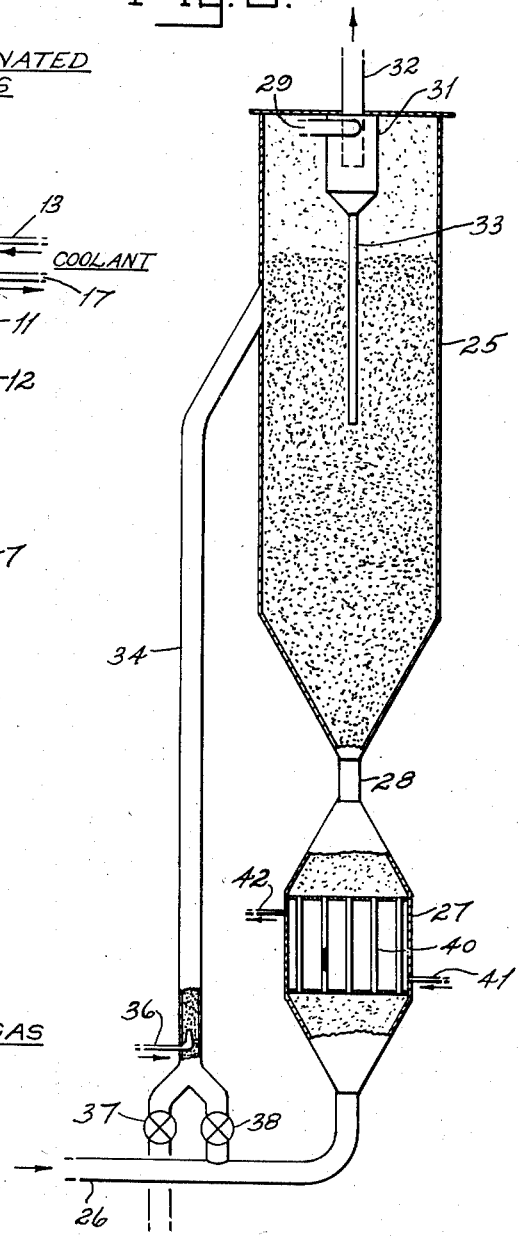
INVENTOR.
JOHN C. KALBACH
BY
ATTORNEYS Dec. 30, 1952  J. C. KALBACH  2,623,816
METHOD FOR THE PRODUCTION OF HIGH HEATING VALUE FUEL GAS
Filed Dec. 16, 1947  2 SHEETS—SHEET 2
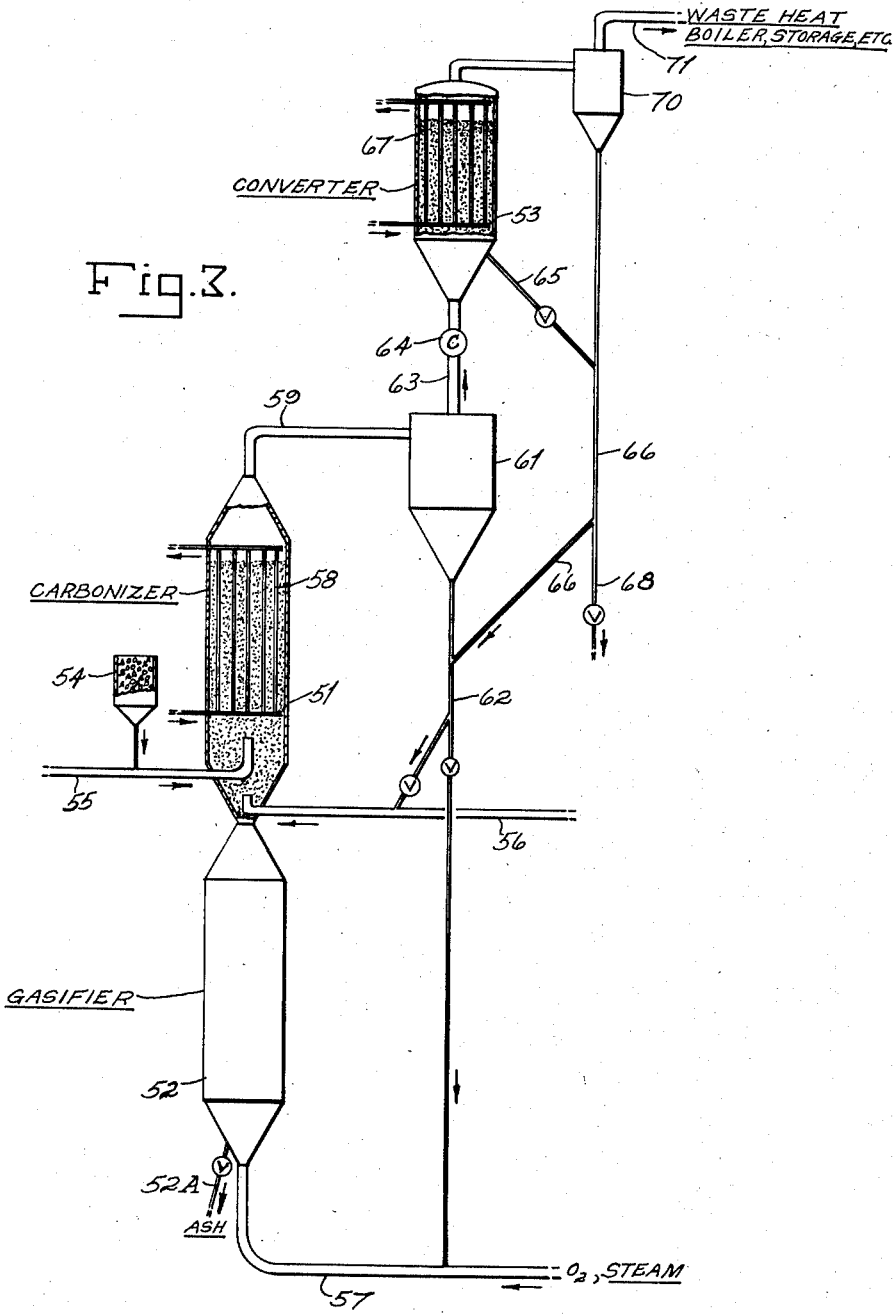

Patented Dec. 30, 1952

2,623,816

UNITED STATES PATENT OFFICE 2,623,816

METHOD FOR THE PRODUCTION OF HIGH HEATING VALUE FUEL GAS

John C. Kalbach, Bronx, N. Y., assignor to Hydrocarbon Research, Inc., New York, N. Y., a corporation of New Jersey Application December 16, 1947, Serial No. 792,014

4 Claims. (Cl. 48—197)

This invention relates to a process for the production of fuel gases of high heating value. The invention is particularly concerned with conversion of hydrogen and carbon monoxide to methane and closely related hydrocarbons. In one of its more specific aspects this invention relates to a non-catalytic process for increasing the heating value of fuel gases containing carbon monoxide and hydrogen by conversion of at least a portion of the carbon monoxide and hydrogen to methane. This invention is particularly useful for upgrading in heating value water gas produced by gasification of coke.

Many different methods have been practiced and proposed for the gasification of solid carbonaceous fuels such as coal, lignite, oil shale and the like. The simpler and cheaper methods have been productive of gases of poor quality as regards their heating value and have been characterized by inefficient conversion of the raw material. The more complicated and expensive methods, productive of fuel gases of better quality, have involved the undesirable processing of the raw feed under relatively high pressures.

It is known that carbon monoxide and hydrogen may be converted to methane and other hydrocarbons. The conversion of carbon monoxide and hydrogen to hydrocarbons suitable as motor fuels is carried out under elevated temperatures and pressures in the presence of a catalyst, generally of the iron group, i. e. iron, cobalt, and nickel. Methane may be produced by the direct reaction between carbon monoxide and hydrogen either catalytically or noncatalytically. The reduction of carbon monoxide to methane is highly exothermic and, as a result, the reaction has not heretofore been conducted in the absence of a catalyst commercially because of the practical inability to control the temperature of the reaction. The present invention provides a noncatalytic process wherein hydrogen and carbon monoxide may be reacted to form primarily methane under carefully controlled temperature conditions suitable for commerical operation. By means of the present invention, it is feasible to upgrade in heating value any fuel gas containing an appreciable quantity of hydrogen and carbon monoxide.

An object of this invention is to provide a process for the production of fuel gas of high heating value. Another object is to provide an improved method for the conversion of hydrogen and carbon monoxide to methane and like hydrocarbons. Still another object is to provide a process for increasing the heating value of fuel gas containing carbon monoxide and hydrogen. A further object of the invention is the provision of a process in the conversion of carbon monoxide and hydrogen primarily to methane. Other objects and advantages will appear from the following description and the accompanying drawings.

Figure I of the drawings is a diagrammatic elevational view in cross-section of apparatus suitable for carrying out the present invention.

Figure II is a diagrammatic elevation, partly in cross-section, of a modified form of apparatus suitable for carrying out the present invention.

Figure III is a diagrammatic elevational view illustrating the process of the present invention as applied to the gasification of solid carbonaceous material to form a fuel gas of high heating value.

The present invention provides an improved method for the conversion of hydrogen and carbon monoxide either in relatively pure form or in admixture with other gases to hydrocarbons, principally methane. In accordance with this invention, the hydrogen and carbon monoxide are passed at elevated pressure into contact with a mass of finely divided inert solid material maintained under a closely regulated elevated temperature. The pressure may be within the range of from about 150 to about 450 pounds per square inch guage while the controlled temperature is within the range of from about 1000° F. to about 1350° F. As long as the foregoing conditions are maintained, the methanation reaction proceeds at a relatively rapid rate in the absence of a catalyst.

In one specific embodiment of the present invention, finely divided carbon is used as the finely divided solid contact material. While any material which is inert to the reaction may be used, carbon is especially suitable, since it is formed as a by-product of the reaction.

It is critical to this invention that the mass of inert particles be maintained in a well fluidized state for at least two reasons. First, fluidization permits a uniform temperature throughout the mass, thus avoiding hot spots which interfere with good methanation. Second, fluidization is the only practical technique by which the large heat of reaction released in the mass can be transferred therefrom to a stuitable coolant. Accordingly, the solid particles are generally cooled by contact with a solid cooling surface under conditions effecting rapid and efficient transfer of heat from the solid particles to the cooling surface.

In the present invention, the fluidized mass of solid contact material serves primarily as a heat absorbing reservoir which can readily be maintained at any desired reaction temperature. Cooling surfaces to effect removal of heat from the fluidized mass, and hence from the reaction zone may be disposed within the reaction zone or externally thereof. In either event, the turbulent movement of the contact material relative to the cooling surfaces effects rapid and efficient heat transfer.

The reactions which take place in the conversion of carbon monoxide and hydrogen to methane are probably as follows:

$$2CO + 2H_2 \rightarrow CH_4 + CO_2$$
$$CO + 3H_2 \rightarrow CH_4 + H_2O$$

The following reactions are also believed to take place, thus accounting for the carbon produced.

$$2CO \rightarrow C + CO_2$$
$$CO + H_2 \rightarrow H_2O + C$$
$$CH_4 \rightarrow 2H_2 + C$$

Regardless of the theory of the mechanism of the reaction, the present invention is operative to produce methane in an efficient and trouble-free manner due in a large part to the excellent temperature and reaction control obtained.

The invention will more fully be understood with reference to the accompanying drawings wherein the invention is described by way of example in connection with the upgrading in heating value of fuel gas resulting from the gasification of coke. The gasification of coke by the water gas reaction yields a fuel gas containing relatively large amounts of carbon monoxide and hydrogen.

In accordance with this invention as illustrated in the embodiment of Figure I, feed gas containing hydrogen and carbon monoxide suitably water gas, is introduced through a conduit 6 to a reactor 7 containing a fluidized mass of finely divided carbon. The fluidized mass in the reaction zone is maintained under a pressure within the range of from about 150 to 450 pounds per square inch gauge and at a temperature within the range of from about 1000° to about 1350° F. Under these conditions, methane is formed as the principal product of the reduction of carbon monoxide, the reaction proceeding in the absence of any catalyst. The resulting gases are withdrawn from the reactor through a porous refractory filter 8 and conduit 9. The fuel gases leaving the reactor are suitably upgraded in heating value relative to the entering water gas due to the formation of methane. Filter 8 serves to remove from the gas stream finely divided particles of carbon which tend to be carried over due to entrainment in the effluent gases.

Cooling of the fluidized mass is effected by cooling tubes 11 which extend into the fluidized bed of carbon and present a relatively large surface to the fluidized carbon. A coolant, e. g., water, is admitted to the cooling tubes 11 through feed conduits 12 which extend into the cooling tubes. The water is introduced through pipe 13 into a header 14 whence it flows into the numerous feed conduits 12 disposed in a tube sheet 15. Water from the feed conduits is discharged into the cooling tubes 11 near the closed lower ends thereof and flows upwardly through the annular spaces between the feed conduits and the cooling tubes. The resulting heated water and steam is collected in header 16 and withdrawn through a pipe 17. The steam generated in this manner may be used for developing power or in the gasification of coke to produce the original water gas containing hydrogen and carbon monoxide.

The arrangement of cooling surface illustrated and described is a preferred embodiment of apparatus suitable for carrying out the present process. The invention is not to be construed as limited to the use of this particular form of cooling surface since other arrangements are effective to accomplish removal of heat from the fluidized solids as will be evident from Figure II. Obviously, other coolants may be used in the place of water, for instance, mercury, a mixture of phenyl ether and diphenyl, or molten mixed salts.

Carbon is produced by the reaction carried out in reactor 7 and this carbon may be removed from the reactor by withdrawal through a side-arm conduit 18. A small stream of fuel gas, steam or other gas is introduced to conduit 18 through pipe 21 to aerate the carbon within the conduit and keep it in free-flowing condition. The carbon is withdrawn from conduit 18 at the desired rate as controlled by valve 22.

With reference to Figure II, a modified form of reactor is illustrated wherein the cooling surface is arranged in a somewhat different manner. In this embodiment feed gases containing hydrogen and carbon monoxide are admitted to a reactor 25 from line 26 through cooling zone 27 and an opening 28 at the bottom of the reactor. As in the embodiment described in connection with Figure I, the reaction between carbon monoxide and hydrogen to form methane takes place in the reactor in the presence of a fluidized bed of carbon. The effluent gases are withdrawn through opening 29 into a separator 31 of the cyclone type and discharged from the cyclone separator 31 through conduit 32. The gases discharged through conduit 32 contain an appreciable quantity of methane and thus have been upgraded in heating value. The effluent gases are substantially free from entrained carbon. Carbon in finely divided form which tends toward entrainment in the effluent gases is separated therefrom by the separator 31 and returned to the fluidized bed through a stand pipe 33. Carbon from the fluidized bed 25 is withdrawn through the side-arm conduit 34 at a relatively rapid rate for recirculation to the reaction zone after cooling in cooling zone 27.

Gas for aeration of the carbon in conduit 34 is admitted to the conduit through the pipe 36. Carbon is withdrawn through an outlet controlled by valve 37 at a rate commensurate with the rate at which carbon is formed in the reaction zone. The bulk of the carbon is passed via valve 38 into feed line 26 wherein it is picked up by the incoming gas and carried through cooling zone 27. In the cooling zone 27 the carbon carried by the gas containing hydrogen and carbon monoxide is passed over a relatively large cooling surface.

The cooling surface is suitably made up of a number of tubes 40 arranged for indirect heat exchange between the coolant and the solid. As shown, the coolant is on the outside of the tubes. Various satisfactory heat exchangers suitable for the purpose are well known and need not be described in detail herein. Water or other coolant is supplied to the cooling zone 27 through pipe 41 and withdrawn through pipe 42.

Recirculation of carbon from reaction zone 25 through cooling zone 27 in relatively large volumes effects an efficient and rapid heat transfer from the reaction zone 25 to the coolant and effectively controls the reaction temperature.

As mentioned previously, the present invention is useful in the gasification of coal or other carbonaceous solids suited as fuels to produce a fuel gas. The arrangement of Figure III, forming a part of my invention, illustrates specifically a coal gasification process involving methanation of carbon monoxide and hydrogen to yield a fuel gas of high heating value.

Figure III illustrates a fluidized process for the carbonization and gasification of solid carbonaceous materials at substantially atmospheric pressure, the hot product gases comprising hydrogen and carbon monoxide, being compressed to an elevated pressure to promote the methanation reaction within a fluidized mass of solid carbon. More specifically, this embodiment of my invention contemplates the carbonization of the fresh solid material by subjecting the material at substantially atmospheric pressure to contact with hot gases and solids flowing from the gasification zone wherein the devolatilized solid residue of the fresh material is reacted exothermically with such reactants as oxygen and steam, compression of the hot gases leaving the gasification zone to an elevated pressure and their reaction in the fluidized mass of carbon at such pressure to yield methane, the production of carbon being incident to methanation in sufficient quantity as to enable its use in the gasification and/or its withdrawal as a valuable by-product. All the reactions are conducted with the solid reactants in a fluidized, ebullient phase, the process being substantially self-sufficient as regards its heat requirements and the power required for compression of the gas.

Other features of this embodiment of the invention will appear from the following detailed description wherein the process is described by way of example in connection with the gasification of coal. As illustrated, the process involves the use of a carbonizer 51, a gasifier 52, and a converter 53, the latter being suitably of the type already described in connection with Figures I and II. It is designed to operate with an internal pressure in the order of 150 to 450 pounds per square inch gauge. Coal in the form of particles of sizes capable of being fluidized is fed from a hopper 54 into a line 55 where it is entrained by a gas flowing through line 55 and charged to the carbonizer 51. The gas employed in line 55 is of a non-oxidizing type such as water-gas or carbon dioxide or it may be a portion of the resultant product gas. Additional gas to aid in the fluidization of the coal and to carry recycle carbon may be charged through line 56.

The coal in reactor 51 is devolatilized and coked by contact with hot gases and coke from reactor 52 which is operated at a higher temperature than reactor 51. An oxygen-containing gas (preferably at least 95 per cent oxygen) and steam are charged through line 57 into reactor 52 wherein they fluidize and gasify the coke particles. Temperature in reactor 52 is generally in the range of 1400–2000° F. The coke and charged gases react in reactor 52 with the production of gases including $H_2$ and $CO$. Since most solid carbonaceous materials contain non-combustible components or ash, the reaction system is provided with means for drawing off solids which have become enriched in ash content. As shown in Figure III, a valved pipe 52A is connected to the lower portion of gasifier 52 to permit withdrawal of solids of high ash content.

The temperature of carbonization in reactor 51 and consequently the temperature of the discharged gases are preferably controlled by the use of a heat exchanger 58 through which a coolant such as water may be passed. It is generally desired that the temperature of carbonization be in the range of 1000 to 1600° F. to carbonize the coal and yield reactive coke.

The effluent gases, which are characterized by a high content of hydrogen and carbon monoxide, are fed through line 59 to a cyclone separator 61, the entrained solids therewith, chiefly coke, being returned to lines 56 or 57 or both by line 62 for recharging to the reactors.

The reactions in reactors 51 and 52 take place at substantially atmospheric pressure so that there is no problem in feeding the fresh coal as occurs when it is fed against pressure in other processes, and considerable expense in the way of heavier reactors, pressure seals, etc., is saved.

The effluent gas from separator 61 is taken off by line 63 and compressed in a compressor 64 to a pressure in the range of 150 to 450 pounds per square inch gauge. Compressor 64 is preferably of the highly efficient centrifugal type such as that used in connection with gas turbines and superchargers. The power required for compression may be taken from the steam generated in the heat exchangers of reactor 51 and convertor 53. The compressed gas is charged to convertor 53 and utilized to effect the fluidization of, and react in the presence of, the carbon contained therein. At the beginning of the process, an initial supply of carbon is required in convertor 53. Temperature in reactor 53 is in the range of 1000 to 1350° F. Once the process is begun, the free carbon formed in the reaction will necessitate withdrawal of carbon from convertor 53 so that in time the original carbon supply will have been replaced by carbon formed within convertor 53. Carbon is withdrawn by way of line 65 and/or line 69 and discharged into line 66 connected with line 62 for use in reactors 51 and 52. The temperature in the convertor is controlled by a heat exchanger 67 with a coolant circulated therethrough. Product carbon in very finely divided and highly active form can be withdrawn as a by-product through line 68.

The resultant gas, enriched in methane, is conducted by line 69 to a cyclone separator 70, entrained solids being removed and returned through line 66. The gas, still under pressure may be passed by line 71 to a waste heat boiler for recovery of the heat therefrom and subsequently washed with water to remove $CO_2$. The ability to remove $CO_2$ by a water wash is improved because of the high pressure of the gas and represents considerable savings when compared with the removal of $CO_2$ in an absorption tower operating at atmospheric pressure.

The final product gas with its increased methane content is of relatively high heating value and well suited for use as a fuel gas.

It will be noted throughout that the process is self-sufficient as regards its heat and energy requirements, even to the energy required for compressing the raw gas prior to its being charged to the convertor. By reason of the cooperation between the conversion phase, the carbonization phase, and the gasification phase as regards the heat utilization, the recycling of the carbon produced in the methanation convertor, and the formation of methane in the conversion zone, the overall efficiency of the process as well as the quality of the final product gas is raised to a high order.

Obviously many modifications and variations of the invention as above set forth may be made without departing from the spirit and scope thereof and only such limitations should be imposed as are indicated in the appended claims.

I claim:

1. A process for the production of a fuel gas of high heating value from a solid carbonaceous material having volatile components and a solid residue containing carbon, which comprises maintaining a fluidized mass of said solid residue in a gasification zone, maintaining a fluidized mass of said solid carbonaceous material and solid residue in a carbonization zone, gasifying the carbon of said solid residue exothermically with oxygen and steam in said gasification zone, passing resulting hot gases from said gasification to said carbonization zone, introducing said solid carbonaceous material in comminuted form into said carbonization zone to effect volatilization of the volatile components thereof and produce additional solid residue, passing solid residue from said carbonization zone to said gasification zone, passing gas containing hydrogen and carbon monoxide from said carbonization zone through a fluidized mass of carbon maintained in a methanation zone at an elevated pressure within the range of from about 150 to about 450 pounds per square inch gauge and a temperature within the range of from about 1000 to about 1350° F., whereby carbon monoxide and hydrogen are consumed with concomitant production of methane and carbon, recovering a fuel gas of high heating value, and passing carbon produced in said methanation zone to said gasification zone for the production of additional carbon monoxide and hydrogen.

2. A process for the production of a fuel gas of high heating value from a solid carbonaceous material having volatile components and a solid residue containing carbon, which comprises maintaining a fluidized mass of said solid residue in a gasification zone, maintaining a fluidized mass of said solid carbonaceous material and solid residue from said carbonization zone to the carbon of said solid residue exothermically with oxygen and steam in said gasification zone, passing resulting hot gases from said gasification zone to said carbonization zone, introducing said solid carbonaceous material in comminuted form into said carbonization zone to effect volatilization of the volatile components thereof and produce additional solid residue, passing solid residue in a carbonization zone, gasifying said gasification zone, passing gas containing hydrogen and carbon monoxide from said carbonization zone through a fluidized mass of carbon maintained in a methanation zone at an elevated pressure within the range of from about 150 to about 450 pounds per square inch gauge and a temperature within the range of from about 1000 to about 1350° F., whereby carbon monoxide and hydrogen are consumed with concomitant production of methane and carbon, and discharging from said methanization zone a fuel gas of high heating value.

3. A process for the production of a fuel gas of high heating value from a solid carbonaceous material having volatile components and a solid residue containing carbon, which comprises maintaining a fluidized mass of said solid residue in a gasification zone, maintaining a fluidized mass of said solid carbonaceous material and solid residue in a carbonization zone, gasifying the carbon of said solid residue exothermically with oxygen and steam in said gasification zone, passing resulting hot gases from said gasification zone to said carbonization zone, introducing said solid carbonaceous material in comminuted form into said carbonization zone to effect volatilization of the volatile components thereof and produce additional solid residue, passing solid residue from said carbonization zone to said gasification zone, passing gas containing hydrogen and carbon monoxide from said carbonization zone through a fluidized mass of carbon maintained in a methanization zone at an elevated pressure above about 150 pounds per square inch gauge and a temperature within the range of from about 1000 to about 1350° F., whereby carbon monoxide and hydrogen are consumed with production of methane, and discharging from said methanization zone a fuel gas of high heating value.

4. In a process for the production of a fuel gas of high heating value from a solid carbonaceous material having volatile components and a solid residue containing carbon, the improvement which comprises subjecting a fluidized mass of said solid residue to exothermic gasification with oxygen and steam, thereby producing carbon monoxide and hydrogen, passing hot gases resulting from said gasification into contact with a fluidized mass comprising said solid carbonaceous material in comminuted form to effect volatilization of volatile components therefrom and produce additional solid residue as the source of said solid residue subjected to gasification, passing the gas resulting from said gasification and subsequent contact with said solid carbonaceous material into contact with a fluidized mass of carbon at an elevated pressure above about 150 pounds per square inch gauge and a temperature within the range of from about 1000 to about 1530° F., whereby carbon monoxide and hydrogen are consumed with the production of methane, and recovering from the process fuel gas of high heating value comprising carbon monoxide, hydrogen, methane and volatilized components from said solid carbonaceous material.

JOHN C. KALBACH.

REFERENCES CITED

The following references are of record in the file of this patent:

UNITED STATES PATENTS

| Number | Name | Date |
| --- | --- | --- |
| 1,984,380 | Odell | Dec. 18, 1934 |
| 2,094,946 | Hubmann | Oct. 5, 1937 |
| 2,187,872 | Winkler | Jan. 23, 1940 |
| 2,357,901 | Lewis et al. | Sept. 12, 1944 |
| 2,360,787 | Murphree | Oct. 17, 1944 |
| 2,434,537 | Barr et al. | Jan. 13, 1948 |
| 2,436,938 | Scharmann et al. | Mar. 2, 1948 |

FOREIGN PATENTS

| Number | Country | Date |
| --- | --- | --- |
| 278,745 | Great Britain | Jan. 7, 1929 |
| 479,931 | Great Britain | Feb. 9, 1938 |
| 503,158 | Great Britain | Apr. 3, 1939 |
| 519,246 | Great Britain | Mar. 20, 1940 |

OTHER REFERENCES

Meade, "Modern Gasworks Practice," 2nd edition, 1921, page 384.